United States Patent Office 3,431,318
Patented Mar. 4, 1969

3,431,318
OLEFIN OLIGOMERIZATION
James D. McClure, Oakland, Calif., assignor to Shell Oil Company, New York, N.Y., a corporation of Delaware
No Drawing. Filed Oct. 12, 1967, Ser. No. 674,752
U.S. Cl. 260—683.15      10 Claims
Int. Cl. C07c 3/20; B01j 11/00

ABSTRACT OF THE DISCLOSURE

Terminal olefins are oligomerized to a mixture consisting principally of linear olefin dimers and trimers in the presence of a homogeneous oligomerization catalyst prepared from an alkali metal tetra-coordinate organoaluminate compound and a salt of divalent nickel and a halogenated chelating anion.

Background of the invention

Field of the invention.—It is well known that hydrocarbon-soluble complexes of low-valent transition metals are useful in the conversion of low-molecular weight olefins to higher molecular weight products, e.g., dimers, trimers and other lower oligomers as well as high-molecular weight polymeric materials. The type of product observed, e.g., the extent of oligomerization, as well as the stability of the resulting catalyst, is greatly dependent upon the character of the components employed to produce the catalyst complex. In the general method of producing the transition metal complexes which comprises adding to the reaction mixture a hydrocarbon-soluble transition metal salt and a hydrocarbon-soluble aluminum reducing agent, substantial variations in product type, catalyst stability and olefin conversions are encountered when the character of the catalyst complex precursors is varied.

Description of the prior art.—One typical class of hydrocarbon-soluble catalyst complexes comprises catalysts produced by contacting a hydrocarbon-soluble nickel compound and a halogen-containing tricoordinate organoaluminum compound. The Belgian Patent No. 640,535, issued Nov. 28, 1963, to Shell Internationale Research Maatschappij N.V., describes a process wherein a catalyst produced from hydrocarbon-soluble nickel salts and an alkyl aluminum chloride is employed to dimerize olefins. A similar process utilizing the catalyst of Nowlin et al., U.S. 2,969,408, issued Jan. 24, 1961, which catalyst was produced from a hydrocarbon-soluble triphenylphosphine nickel carbonyl and an alkyl aluminum chloride, resulted in ethylene polymerization.

Homogeneous catalyst compositions of a hydrocarbon-soluble nickel compound and a tricoordinate organoaluminum compound also serve to isomerize terminal olefins to internal olefins. For example, Chauvin et al., Compt. Rend., 259, 2105 (1964) disclose that 1-butene isomerizes in the presence of a catalyst composition of triethylaluminum and dipyridinyl nickel chloride to 2-butene in 97.5% selectivity. This type of catalyst system, when applied to an oligomerization process, e.g., that of the copending U.S. application of Cannell et al., Ser. No. 642,184, filed May 29, 1967, which discloses a homogeneous catalyst produced by contacting a nickel chelate wherein the chelating ligand is a halogenated β-dicarbonylic compound monoenolate and a halide-free alkyl aluminum alkoxide, effects isomerization of a terminal olefin feed as well as oligomerization of the olefins to a mixture of principally olefin dimers and trimers which, although useful in many applications is composed of chiefly branched-chain products.

Summary of the invention

It has now been found that increased selectivity to linear dimers in the process of oligomerizing terminal olefins is afforded by employing a homogeneous catalyst composition produced by contacting (a) certain chelates of divalent nickel wherein the chelating anion-ligands are substituted with electron-withdrawing groups and (b) halide-free alkali metal tetra-coordinate organoaluminate compounds. The increased selectivity to linear dimers is considered to result from a decrease in olefin isomerization to internal olefins which necessarily results in any product derived therefrom being of a branched-chain structure.

Description of preferred embodiments

The olefin reactant.—The process is broadly applicable to the oligomerization of terminal monoolefins, i.e., α-olefins, of two or more carbon atoms. Preferred olefins, however, are normal (straight-chain) hydrocarbon terminal monoolefins of from 2 to 10 carbon atoms such as ethylene, propylene, 1-butene, 1-pentene, 1-hexene, 1-octene and 1-dodecene. Lower α-olefins of from 4 to 6 carbon atoms, e.g., 1-butene, 1-pentene and 1-hexene, are particularly preferred.

The catalyst.—The oligomerization catalyst comprises the product of the contacting of (a) certain nickel chelates wherein the chelating ligand-anion is substituted with electron-withdrawing groups, e.g., nitro, halo, cyano or carboalkoxy groups, and (b) halide-free alkali metal tetra-coordinate organoaluminate compounds. Although a variety of nickel chelates is operable as the catalyst precursor, superior results are obtained when the nickel chelate is a chelate wherein the chelating ligands are halogenated organic ligands. One class of such chelates incorporates halogenated chelating organo anionic moieties which are representatable as β-dicarbonylic compound monoenolates. Chelating ligands of this type are characterized by the presence within the molecular structure thereof of halogen substituents and a moiety represented by the Formula I:

(I)

wherein the nickel is bonded to the monovalent oxygen atom. It must be appreciated that within the nickel chelate structure electron delocalization prevents complete description of the chelate by means of a single structure. One representative formula, however, is the following Formula II:

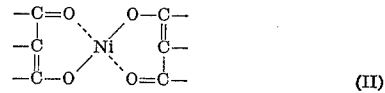

(II)

wherein the dotted lines represent interaction between the unshared electron pairs of the oxygen and the vacant electron orbitals of the nickel.

In terms of the Formula II the nickel chelate employed to form the oligomerization catalyst is represented by the Formula III:

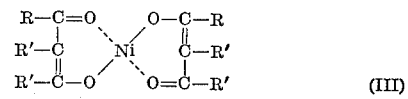

(III)

wherein R and R' independently are hydrogen, alkyl or aryl of up to 10 carbon atoms, or haloalkyl or haloaryl of up to 10 carbon atoms, with the proviso that the two R' groups of each chelating ligand together with the adjacent carbon atoms to which they are attached, may form a six-membered carbocyclic aromatic ring of up to 4 halogen substituents. The halogenated chelating ligand preferably has up to 15 carbon atoms and from 2 to 8 halogen substituents, but more preferably has up to 10 carbon atoms and from 3 to 6 halogen substituents. The halogen substituents of the chelating ligand are suitably fluorine, chlorine, bromine or iodine, but best results are obtained when the halogen substituents are halogen of atomic number 9 to 17 inclusive, that is fluorine or chlorine.

Illustrative of suitable nickel chelates of the Formula III wherein each R and R' is a monovalent radical are the chelates derived from hologenated β-diketone monoenolates, e.g., bis(1,1,1 - trifluoro-2,4-pentandionato)nickel (II), bis(1,1,1 - trifluoro-4-phenyl-2,4-butandionato)nickel (II), bis - (1,1,1-trichloro-2,4-pentandionato)nickel (II), bis(1,1,1-trifluoro-3-ethyl-2,4 - pentandionato)nickel (II) bis(1,1,5,5-tetrafluoro-1,5-diphenyl - 2,4 - pentandionato)nickel (II), bis(1,1,1,5,5 - pentachloro-2,4-pentanodionato)nickel (II) and bis(1,1,1,5,5,5-hexafluoro-2,4-pentandionato)nickel (II). The class of halogenated bis (2,4-pentandionato)nickel (II) chelates, more commonly referred to as halogenated nickel acetylacetonates is a preferred class of the halogenated β-diketone chelates, and especially preferred are the fluorinated acetylacetonate chelates of nickel.

In an alternate modification, the chelating ligand comprises an aromatic ring compound, i.e., compounds of the Formula III wherein the R' groups together from a divalent radical in which the monoenol configuration is maintained as a part of the aromatic ring. These chelating ligands are characterized as o-formylphenols or p-alkanoylphenols having halogen substituents on the aromatic ring and/or on an aliphatic side chain. In terms of the phenols whose nickel salts are the catalyst precursors, illustrative chelating ligands include 3,5-dichlorosalicyladehyde, o-trichloroacetylphenol, 3,4,5-trifluroacetylphenol, 3,4,5-trifluorosalicylaldehyde, 3,5-dichloro-2-trichloroacetylphenol and 4-trifluoromethylsalicylaldehyde. An illustrative nickel chelate of this class is bis(3,5-dichlorosalicylaldehydo)nickel (II).

The alkali metal tetra-coordinate organoaluminate compound employed in production of the oligomerization catalyst comprises an alkali metal tetra-coordinate alkyl hydrocarbyloxide aluminate of from 1 to 3 alkyl groups and from 3 to 1 hydrocarbyloxide groups. Although alkali metal alkyl aryloxide aluminates, e.g., sodium alkyl phenoxide aluminates, are suitable catalyst precursors, the preferred class comprises alkali metal alkyl alkoxide aluminates represented by the Formula IV:

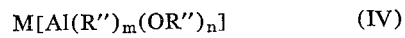

wherein M is an alkali metal of atomic number 3 to 55 inclusive, i.e., lithium, sodium, potassium, rubidium or cesium, each R'' independently is alkyl of up to 10 carbon atoms, preferably of up to 4 carbon atoms, $m$ is a whole number from 1 to 3 inclusive, preferably from 2 to 3 inclusive, and $n$ is a whole number from 1 to 3 inclusive, preferably from 1 to 2 inclusive, selected so that the sum of $m$ and $n$, i.e., the term $(m+n)$, equals 4. The halide-free alkali metal tetra-coordinate organoaluminate compounds are therefore alkali metal alkyl trialkoxide aluminates, alkali metal dialkyl dialkoxide aluminates, or alkali metal trialkyl alkoxide aluminates such as lithium ethyltriethoxidealuminate, sodium dipropyldipropoxidealuminate, lithium triethylethoxidealuminate, sodium triethylethoxidealuminate, potassium tributylethoxidealuminate and rubidium tripropylethoxidealuminate. In general, lithium trialkyl alkoxide aluminate, sodium trialkyl alkoxide aluminate and potassium trialkyl alkoxide aluminate are preferred catalyst precursors, especially lithium triethylethoxidealuminate, sodium triethylethoxidealuminate and potassium trimethylmethoxidealuminate.

The alkali metal tetra-coordinate alkyl alkoxide aluminate compounds of Formula IV are prepared by intimately contacting substantially equimolar amounts of an alkali metal alkoxide and the appropriate alkyl aluminum alkoxide compound. For example, sodium triethylethoxidealuminate is suitably prepared from sodium ethoxide and triethylaluminum as disclosed by British Patent 864,393 of Ziegler. Similarly, sodium diethyldiethoxidealuminate is suitably prepared from sodium ethoxide and diethylaluminum ethoxide, and potassium propyltripropoxidealuminate is prepared from potassium propoxide and propylaluminum dipropoxide. The alkali metal alkyl alkoxide aluminate compounds of Formula IV are also suitably prepared from alkali metal alkyls and the appropriate alkyl aluminum alkoxide compound. For example, lithium triethylethoxidealuminate is prepared by mixing substantially equimolar amounts of ethyllithium and diethylaluminum ethoxide. Other alternative methods for preparing alkali metal tetra-coordinate organoaluminates are also disclosed by British Patent 864,393 of Ziegler.

In the preparation of the oligomerization catalyst from the nickel chelate and the alkali metal tetra-coordinate organoaluminate compound, it is essential that the alkali organoaluminate compound be formed from the alkali metal and alkyl aluminum alkoxide compounds prior to contacting the nickel chelate. When the precursors of the alkali metal organoaluminate compound are mixed during contacting with the nickel chelate, the resulting oligomerization catalyst does not yield enhanced selectivity to linear olefin dimers. Although it is not known with certainty, it is believed likely that the contacting of the nickel chelate with the organoaluminum compound, e.g., $Al(C_2H_5)_3$ or $(C_2H_5)_2Al(OC_2H_5)$, results in formation of a stable oligomerization catalyst consisting essentially of a nickel chelate-organoaluminum complex which will not subsequently react with an alkali metal containing compound, e.g., $NaOC_2H_5$ or $LiOC_2H_5$, to give the nickel chelate-alkali metal tetra-coordinate organoaluminate catalyst composition of the process of the invention.

The ratio of nickel chelate to alkali metal organoaluminate compound used to form the oligomerization catalyst will in part depend upon the type of alkali metal organoaluminate compound employed. It will be understood that alkali metal trialkyl alkoxide aluminates can be considered as having three moles or alkyl-aluminum bond for each mole of aluminum whereas alkali metal dialkyl dialkoxide aluminates supply two moles of alkyl-aluminum bond per mole of aluminum, and alkali metal alkyl trialkoxide aluminates supply only one mole of alkyl-aluminum bond per mole of aluminum. The quantity of the alkali metal organoaluminate compound is selected so that the ratio of moles of alkyl-aluminum bond provided by the alkali metal organoaluminate compound to the moles of nickel chelate is from about 0.5:1 to about 6:1, preferably from about 1:1 to about 3:1.

The oligomerization catalyst is preferably present in catalytic amounts relative to the olefin to be oligomerized. Impurities such as conjugated dienes, e.g., butadiene, sometimes present in the olefin reactants are believed to cause substantial deactivation of the oligomerization catalyst. Accordingly, it is preferable to employ sufficient oligomerization catalyst to compensate for any loss of catalyst due to interaction with diene impurities. Generally, amounts of oligomerization catalyst prepared from about 0.005 mole to about 0.05 mole of nickel chelate per mole of olefin are satisfactory when the olefin feed has no more than about 0.2% conjugated diene.

The reaction conditions.—The oligomerization process is conducted in liquid phase in an inert reaction diluent which is liquid at the reaction temperature and pressure. Illustrative of suitable reaction diluents are hydrocarbons free from aliphatic unsaturation such as hexane, heptane, decane, cyclohexane, decahydronaphthalene, benzene, toluene, and o-xylene, and ethers including diethyl ether, anisole, tetrahydrofuran, dioxane, dimethyoxyethane and diethylene glycol dimethyl ether. In certain modifications of the process, for example, as when the olefin to be oligomerized or olefinic oligomer product is liquid under reaction conditions, a portion of the olefin suitably serves as reaction diluent and no added reaction diluent is required. When reaction diluent is utilized, however, amounts up to about 4 moles of diluent per mole of olefin are satisfactory. The process is preferably conducted in an inert reaction environment so that the presence of reactive materials such as water and oxygen is desirably avoided. Suitable reaction conditions are therefore substantially anhydrous and substantially oxygen-free.

The method of conducting the oligomerization process is not critical provided that the alkali metal organoaluminate component of the oligomerization catalyst is preformed prior to contacting with the nickel chelate. In one modification, the olefin reactant, the nickel chelate, the alkali metal organoaluminate compound and any diluent which is employed are charged to an autoclave or similar pressure reactor and maintained at reaction conditions for the desired reaction period. It is also useful on occasion to add one reaction mixture component to the others in increments as by adding the olefin to be oligomerized to a solution of the catalyst composition. In yet another modification, the process is conducted in a continuous manner as by contacting the olefin and catalyst composition during passage through a reactor which is typically tubular in form. By any modification, the oligomerization process is most efficiently conducted at elevated temperature and pressure. While the reaction temperature will depend in part upon the particular olefin to be oligomerized and the stability of the oligomerization catalyst, temperatures from about 0° C. to about 250° C. are generally satisfactory with temperatures from about 25° C. to about 150° C. being preferred. Suitable reaction pressures are those which serve to maintain the reaction mixture substantially in the liquid phase. Reaction pressures from about 1 atmosphere to about 50 atmospheres in general are satisfactory and good results are frequently obtained by utilizing autogenous pressure, that is, the pressure generated by the reaction mixture when maintained at reaction temperature in a sealed reaction system.

The products of the oligomerization reaction are principally dimers and trimers of the olefin reactant. In particular, the product mixture is characterized by a high proportion of linear, unbranched oligomer products although monobranched and dibranched products are also observed. By way of illustration, oligomerization of 1-butene leads to a mixture of principally dimer ($C_8$) product and trimer ($C_{12}$) product. The major dimer product is n-octene. Also observed, however, is 3-methylheptene as well as some products of higher molecular weight.

The olefin products are materials of established utility and many are chemicals of commerce. The olefins are useful in the formation of thermoplastic polymers or copolymers or are converted by conventional "Oxo" processes to aldehydes of one more carbon atom which are hydrogenated to the corresponding alcohols. The $C_{12}$–$C_{20}$ alcohols thus produced are ethoxylated or sulfated to form conventional detergents and the lower molecular weight alcohols are esterified with polyhydric acids, e.g., phthalic acid, to form plasticizers for polyvinyl chloride and like plastics. The straight-chain character of the oligomers of the process of the invention renders the oligomers particularly useful for conversion to detergent compounds because of the well-known biogradable nature of straight-chain detergents.

To further illustrate the improved process of the invention, the following examples are provided. It should be understood that the details thereof are not to be regarded as limitations as they may be varied as will be understood by one skilled in the art.

EXAMPLE I

Comparative 1-butene oligomerization experiments were conducted employing a homogeneous catalyst composition produced by contacting nickel hexafluoroacetylacetonate and an alkali metal containing tetra-coordinate organoaluminate compound, namely,

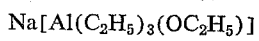

and, for comparison, homogeneous catalyst compositions produced by contacting nickel hexafluoroacetylacetonate and alkali metal-free tricoordinate organoaluminum compounds, e.g., $Al(C_2H_5)_3$ and $(C_2H_5)_2Al(OC_2H_5)$. In runs 1, 5, and 6 of Table I, 360 millimoles (mmoles) of 1-butene and 2 mmoles of nickel hexafluoroacetylacetonate in 20 g. of benzene were contacted with 0.75 mmole of $Na[Al(C_2H_5)_3(OC_2H_5)]$ in about 2 ml. of n-heptane at the indicated reaction temperature for the indicated reaction time in an autoclave. In runs 2–4 of Table I, the reaction mixtures were similar except that the organoaluminum compound was $Al(C_2H_5)_3$ or $$(C_2H_5)_2Al(OC_2H_5)$$

rather than $Na[Al(C_2H_5)_3(OC_2H_5)]$. The reaction conditions employed, the olefin conversion, the selectivity to various oligomers and the percent of straight-chain product are provided in Table I. The product distribution was determined by gas-liquid chromatographic analysis of the olefin product and the percentage of straight-chain product was determined by gas-liquid chromatographic analysis of a hydrogenated product mixture.

TABLE I

| | Run | | |
|---|---|---|---|
| | 1 | 2 | 3 |
| | $Na[Al(C_2H_5)_3$ $(OC_2H_5)]$, 0.75 mmole | $Al(C_2H_5)_3$, 0.75 mmole | $Al(C_2H_5)_2$ $(OC_2H_5)$, 1.0 mmole |
| Temperature, ° C | 100 | 100 | 100 |
| Time, hrs | 1.0 | 1.0 | 1.0 |
| Total conv. to oligomer and to 2-butene | 95 | 84 | 98 |
| Conv. to oligomer, percent | 74 | 46 | 70 |
| Selectivity, percent: | | | |
| n-Octenes | 40 | 19 | 28 |
| Branched octenes | 27 | 28.5 | 26 |
| 2-butene | 22 | 45.5 | 28 |
| Trimer | 11 | 7 | 18 |
| Linearity in dimer, percent | 60 | 40 | 51 |

| | Run | | |
|---|---|---|---|
| | 4 | 5 | 6 |
| | $Et_2AlOEt$, 1.0 mmole | $Na[Al(C_2H_5)_3$ $(OC_2H_5)]$, 0.75 mmole | $Na[Al(C_2H_5)_3$ $(OC_2H_5)]$, 0.75 mmole |
| Temperature, ° C | 60 | 60 | 30 |
| Time, hrs | 0.15 | 0.15 | 1.0 |
| Total conv. to oligomer and to 2-butene | 90 | 85 | 47.5 |
| Conv. to oligomer, percent | 52 | 53 | 30 |
| Selectivity, percent: | | | |
| n-Octenes | 34 | 45.5 | 50 |
| Branched octenes | 14.5 | 10.5 | 9 |
| 2-butene | 41.5 | 37 | 36 |
| Trimer | 10 | 7 | 4.5 |
| Linearity in dimer, percent | 70 | 81.5 | 85 |

EXAMPLE II

By a procedure similar to that of Example I, 360 mmoles of 1-butene and 2 mmoles of nickel hexafluoroacetylacetonate in 20 g. of benzene were contacted with 1 mmole of $Li[Al(C_2H_5)_3(OC_2H_5)]$ at 100° C. for 1 hr. in an autoclave. The product distribution is tabulated in Table II.

Table II

| | |
|---|---|
| Total conversion to oligomer and to 2-butene, percent | 86 |
| Conversion to oligomer | 58 |
| Selectivity, percent: | |
| n-Octenes | 39 |
| Branched octenes | 21 |
| 2-butene | 28 |
| Trimer | 8.5 |
| Linearity in dimer, percent | 65 |

The selectivity to n-octenes (39%) obtained by the use of Li[Al(C₂H₅)₃(OC₂H₅)] is materially higher than the selectivities (18–28%) obtained by the use of Al(C₂H₅)₃ or (C₂H₅)₂Al(OC₂H₅) under identical reaction conditions (see Table I).

A similar increase in selectivity to linear dimers (n-decenes) is obtained in the oligomerization of 1-pentene in the presence of bis - (3,5 - dichlorosalicylaldehydo) nickel (II) and K[Al(CH₃)₃(OCH₃)₃] as catalyst by a procedure similar to that of Example II.

EXAMPLE III

To illustrate that the preparation of an oligomerization catalyst by the addition of an alkali metal compound to a mixture of nickel chelate and an organoaluminum compound, without premixing of the alkali metal compound and the organoaluminum compound to obtain an alkali metal tetra-coordinate organoaluminate complex before contacting with the nickel chelate, results in a catalyst composition which gives essentially the same selectivity to olefin dimers as if no alkali metal compound was present, an experiment was conducted whereby NaOC₂H₅ was added to a mixture of 1-butene containing nickel hexafluoroacethylacetonate and Al(C₂H₅)₃ (Run 1), without preforming the Na[Al(C₂H₅)₃(OC₂H₅)], and, for comparison, an experiment wherein no NaOC₂H₅ was used (Run 2) and an experiment wherein the Na[Al(C₂H₅)₃(OC₂H₅)]

was performed (Run 3). The experiments were performed by a procedure similar to Example I the reactants, reaction conditions, conversion levels and product distribution and percent of normal olefin dimer are provided in Table III.

TABLE III

| Run | 1 | 2 | 3 |
|---|---|---|---|
| 1-butene, mmoles | 360 | 360 | 360 |
| Nickel hexafluoroacetylacetonate, mmoles | 2 | 2 | 2 |
| Al(C₂H₅)₃, mmole | 0.8 | 0.8 | |
| NaOC₂H₅, mmole | 0.8 | 0 | |
| Na[Ni(C₂H₅)₃(OC₂H₅)], mmole | | 0 | 0.8 |
| Benzene, g | 20 | 20 | 20 |
| Time, hr | 1 | 1 | 1 |
| Temperature, °C | 100 | 100 | 100 |
| Total conversion to oligomer and to 2-butene | 94 | 84 | 95 |
| Conversion to oligomer | 60 | 46 | 74 |
| Selectivity, percent: | | | |
| n-Octenes | 22 | 19 | 40 |
| Branched octenes | 29 | 28.5 | 27 |
| 2-butene | 36 | 45.5 | 22 |
| Trimer | 13 | 7 | 11 |
| Linearity in dimer, percent | 44 | 40 | 60 |

EXAMPLE IV

By a procedure similar to that of Example I, 360 mmoles of 1-butene was contacted in an autoclave with 2 mmloes of nickel hexafluoroacetylacetonate and 1 mmole Na[Al(C₂H₅)₃(OC₂H₅)] in various solvents. The reaction conditions and the product distribution are provided in Table IV.

TABLE IV

| Solvent, 20 g | Benzene | Tetrahydrofuran | Dimethoxyethane |
|---|---|---|---|
| Temperature, °C | 75–85 | 80 | 100 |
| Time, hrs | 0.25 | 0.25 | 1 |
| Total conv. to oligomer and to 2-butene, percent | 90 | 30 | 69 |
| Conv. to oligomer, percent | 60.5 | 16 | 37 |
| Selectivity, percent: | | | |
| n-Octenes | 42 | 39.5 | 36 |
| Branched octenes | 17.5 | 8.5 | 12 |
| 2-butene | 33 | 46.5 | 46 |
| Timer | 8 | 5.5 | 6 |
| Linearity in dimer, percent | 70.5 | 82 | 75 |

I claim as my invention:

1. The process of oligomerizing olefins by intimately contacting normal terminal monoolefins of from 2 to 10 carbon atoms and a catalyst consisting essentially of the reaction product of (a) a nickel chelate wherein the chelating ligand is a halogenated β-dicarbonylic compound monoenolate of up to 15 carbon atoms and from 2 to 8 halogen substituents and (b) an alkali metal tetracoordinate organoaluminate represented by the formula M[Al(R″)ₘ(OR″)ₙ] wherein M is alkali metal of atomic number from 3 to 55 inclusive, each R″ independently is alkyl of up to 10 carbon atoms, m is a whole number from 1 to 3 inclusive and n is a whole number from 1 to 3 inclusive selected so that the sum of m and n equals 4, in the liquid phase at a temperature from about 0° C. to about 250° C.

2. The process of claim 1 wherein the nickel chelate is represented by the formula

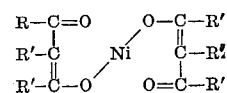

wherein R and R′ independently are hydrogen, alkyl of up to 10 carbon atoms, aryl of up to 10 carbon atoms, haloalkyl of up to 10 carbon atoms or haloaryl of up to 10 carbon atoms, with the proviso that the two R′ groups of each chelating ligand, together with the adjacent carbon atoms to which they are attached, may form a six-membered carbocyclic aromatic ring of up to 4 halogen substituents of atomic number from 9 to 17 inclusive, and wherein M is lithium, sodium or potassium.

3. The process of claim 2 wherein the nickel chelate is a halogenated nickel acetylacetonate of from 3 to 6 halogen substituents and wherein m is from 2 to 3 inclusive and n is from 1 to 2 inclusive.

4. The process of claim 3 wherein the alkali metal organoaluminate is sodium trialkyl alkoxide aluminate or lithium trialkyl alkoxide aluminate.

5. The process of claim 4 wherein each of the halogen substituents is fluorine.

6. The process of claim 5 wherein the olefin is a hydrocarbon monoolefin of from 4 to 6 carbon atoms.

7. The process of claim 6 wherein the olefin is 1-butene.

8. The process of claim 6 wherein the nickel chelate is bis(1,1,1,5,5,5-hexafluoro-2,4-pentandionato)nickel (II).

9. The process of claim 8 wherein the alkali metal organoaluminate compound is Na[Al(C₂H₅)₃(OC₂H₅)].

10. The process of claim 9 wherein the alkali metal organoaluminate compound is Li[Al(C₂H₅)₃(OC₂H₅)].

References Cited

UNITED STATES PATENTS

| | | | |
|---|---|---|---|
| 2,969,408 | 1/1961 | Nowlin | 260—683.15 |
| 3,267,076 | 8/1966 | Ishii et al. | 252—431 X |

PAUL M. COUGHLAN, Jr., *Primary Examiner.*

U.S. Cl. X.R.

252—431